United States Patent Office

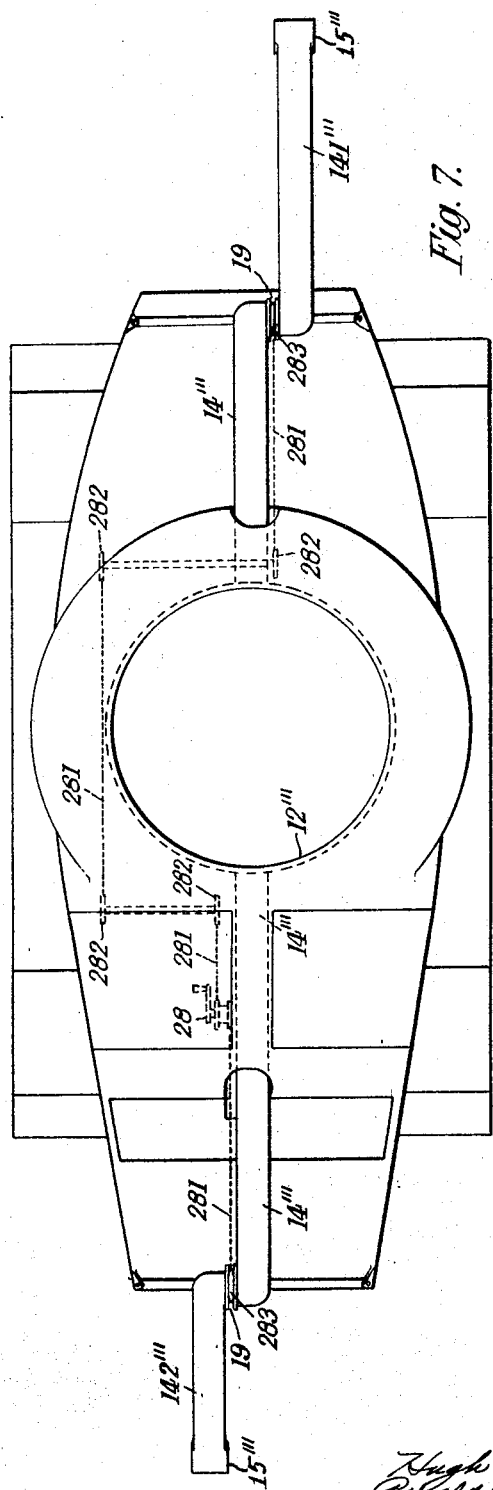

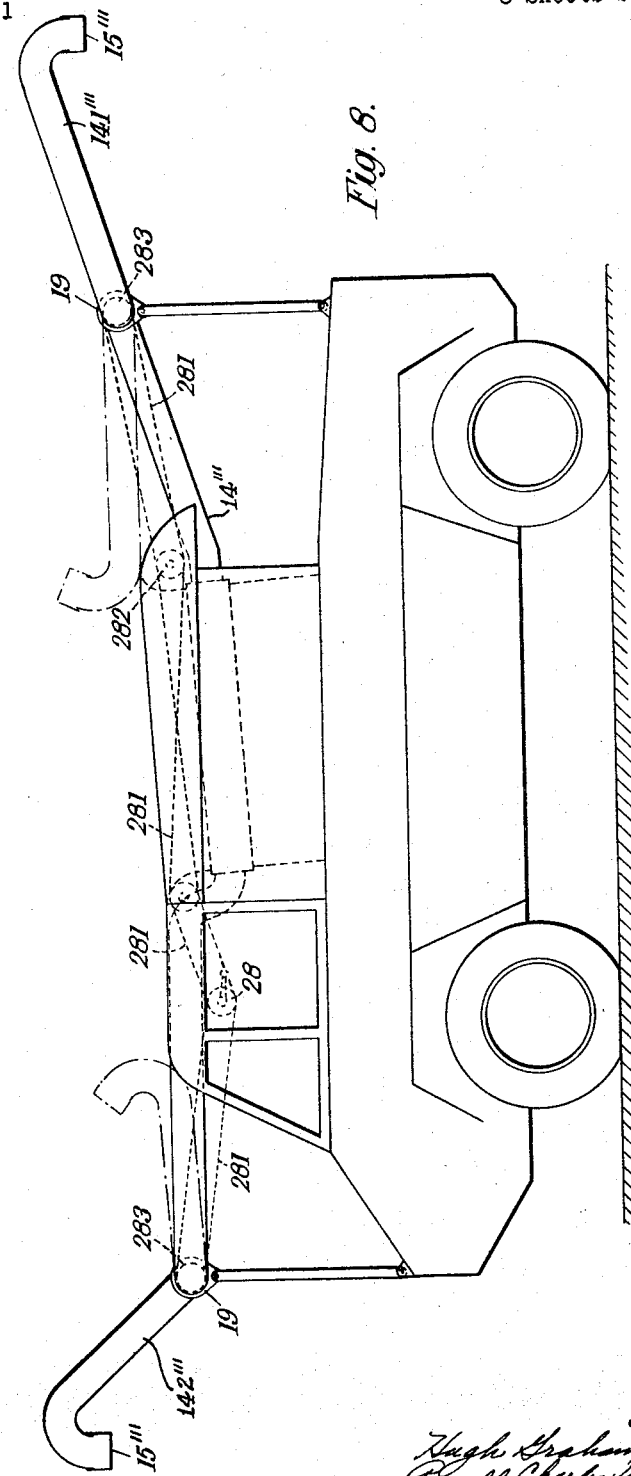

3,265,330
Patented August 9, 1966

3,265,330
CONTROL SYSTEMS OF VEHICLES ADAPTED FOR VERTICAL TAKE-OFF AND LANDING
Hugh G. Conway, Crawfordsburn, and Ronald Charles Victor Armstrong, Belfast, Northern Ireland, assignors to Short Brothers & Harland Limited, Belfast, Northern Ireland
Filed Dec. 26, 1961, Ser. No. 162,037
Claims priority, application Great Britain, Dec. 28, 1960, 44,530/60
6 Claims. (Cl. 244—23)

The invention is concerned with vehicles, normally intended for land surface travel, which are furnished with vertical jet lift take-off and landing (V.T.O.L.) means together with separate means of forward propulsion when airborne. In such vehicles control in flight is exercised through the medium of auxiliary jet nozzles, supplied with compressed air or gas from the main power plant, and which by suitable selective operation may be employed to exert turning moments about the roll, pitch or yaw axes. It is the object of the present invention to provide in a vehicle of the kind described certain improvements relating to the mounting and accommodation of the auxiliary nozzles when the vehicle is in normal use on land.

For the details of certain elements referred to herein reference may be made to the British Patent No. 756,320 which is a good example of auxiliary jet nozzles suplied with compressed air or gas from the main power plant, and by which suitable selective operation can be employed to exert turning moments about the roll, pitch, or yaw axes of the aircraft, and also to British Patent No. 893,942 relating to Jet Lift Aircraft.

According to the invention the auxiliary jet lift nozzles are mounted at the extremities of pipes which are supported at dispersed positions about the sides of the vehicle in such manner as to be capable of retraction, by either hinging or telescopic action, so that when so retracted the nozzles are stowed within the plan form envelope of the vehicle whereby the latter is rendered more suitable for operation on roads or in other confined circumstances.

Figure 1:
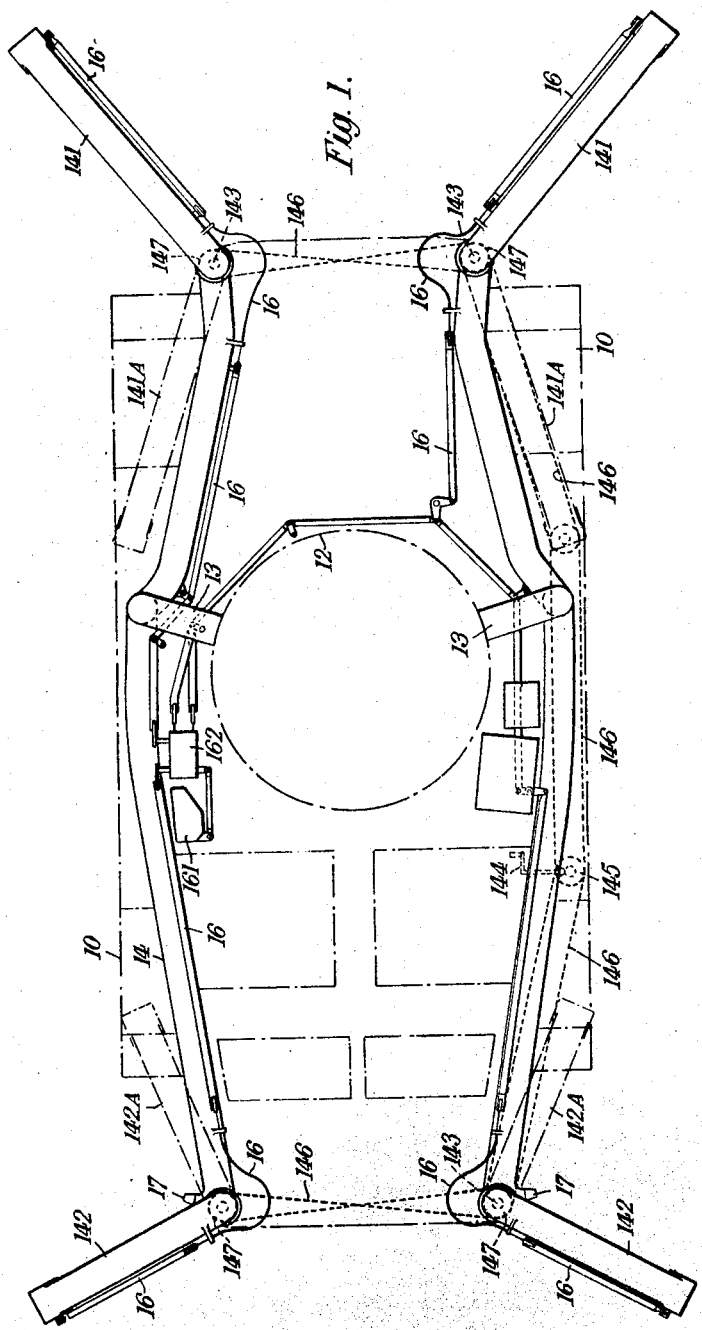
Figure 2:
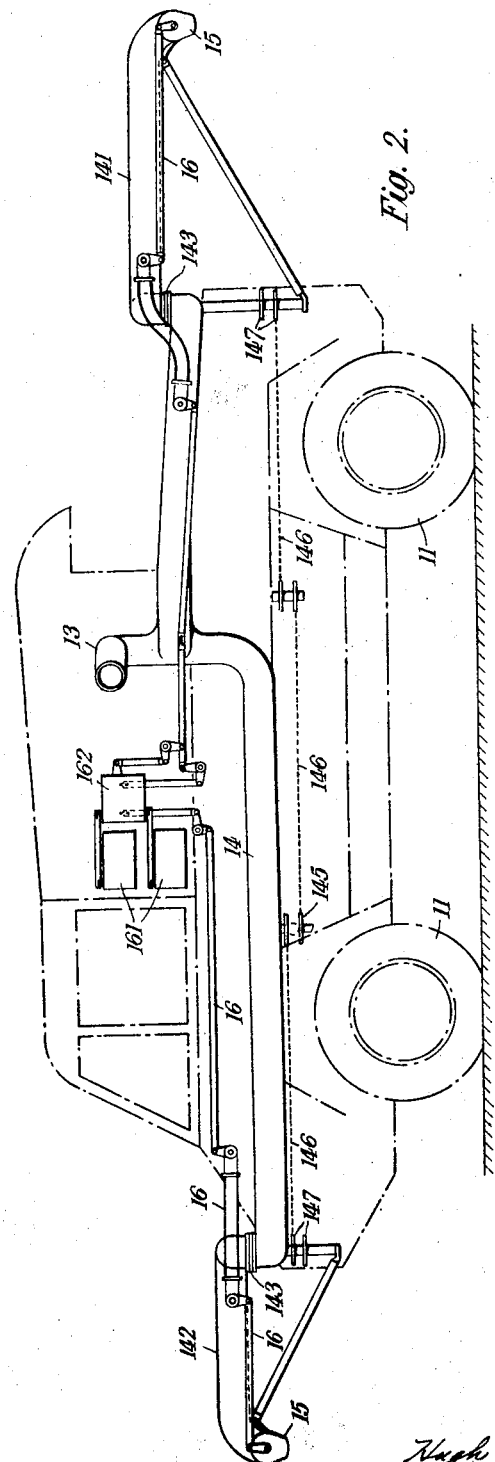
Figure 3:
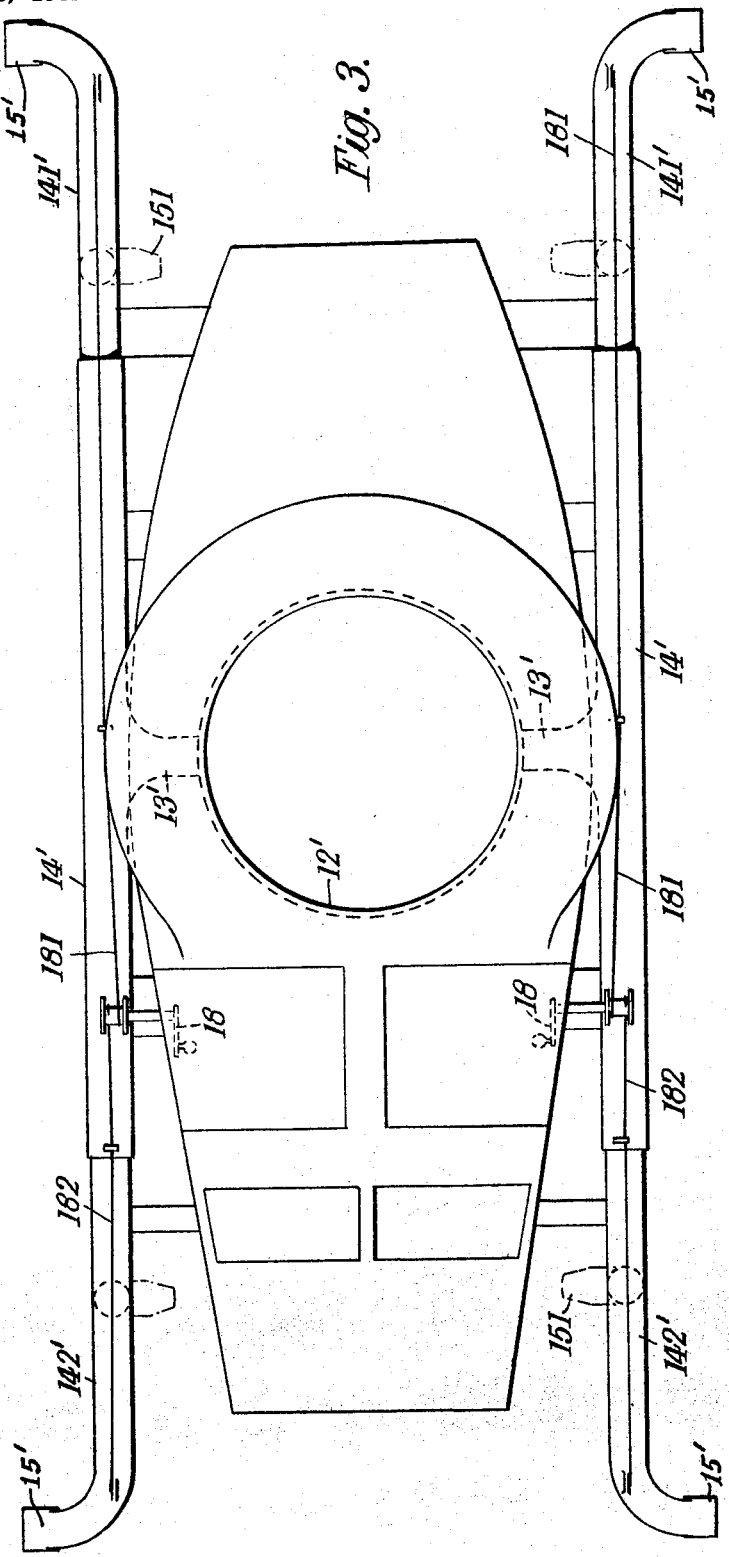
Figure 4:
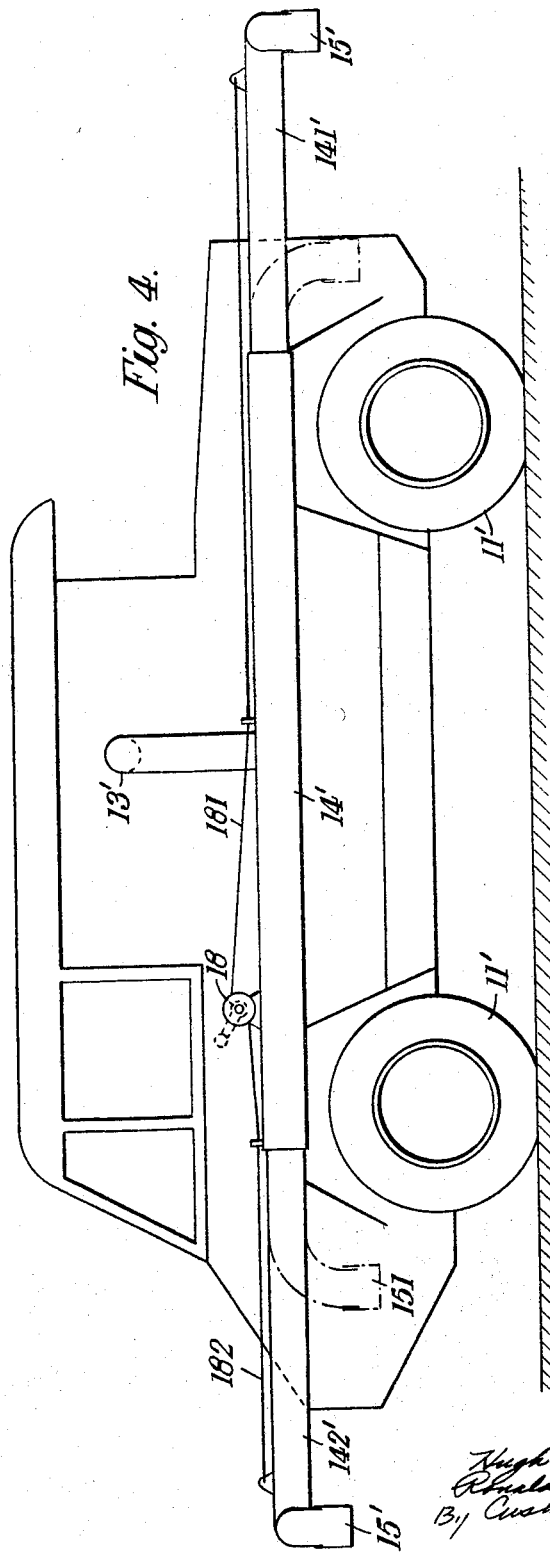
Figure 5:
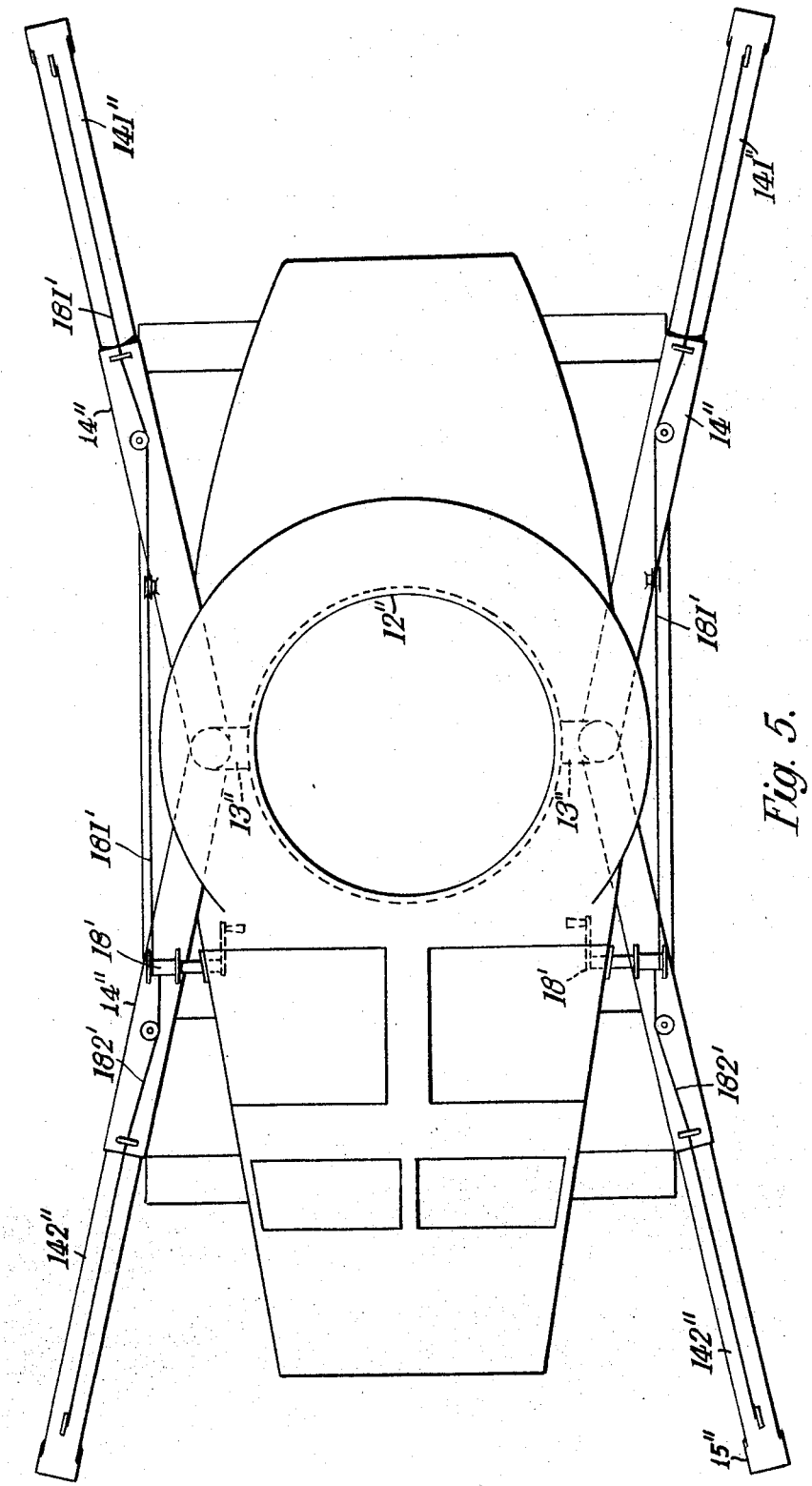
Figure 6:
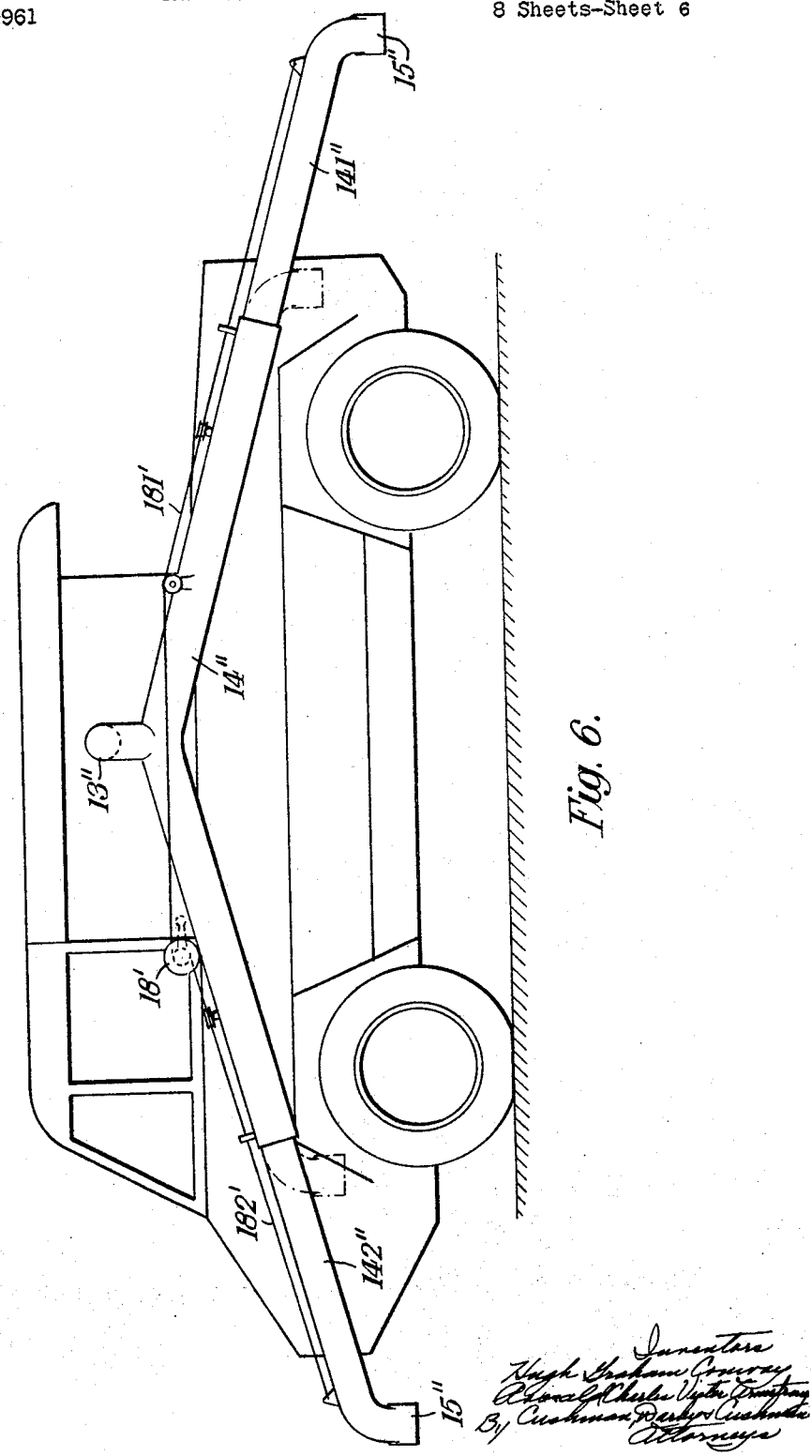

The manner in which the invention may be carried into effect is hereinafter described in greater detail with reference to the accompanying drawings, in which there are illustrated a number of alternative embodiments of the invention. In said drawings, FIGS. 1 and 2 are respectively a plan and a longitudinal elevation of a vehicle incorporating improved flight control means in accordance with the invention. FIGS. 3 and 4 are respectively similar views of another embodiment, FIGS. 5 and 6 are respectively similar views of a third embodiment, and FIGS. 7 and 8 are respectively similar views of still another modified arrangement.

In the embodiment of FIGS. 1 and 2, it will be seen that the vehicle has a generally rectangular plan form envelope indicated by the chain-dotted line 10 and is mounted on road wheels 11, 11. Housed in the centre of the vehicle at 12 is a downwardly directed vertical take off and landing jet engine, compressed air from which is tapped off through the branch-pipes 13, 13. Said pipes 13 lead respectively to main trunks 14, 14 which extend substantially along each side from nose to tail. The ends of the trunks 14 are equidistantly spaced at either side of the longitudinal axis of the vehicle and each carries at each end a subsidiary tubular section 141 or 142 in communication with the trunk and terminating in a downwardly directed jet nozzle 15. Each nozzle 15 has adjustable closure means (not shown, but see those in British Patent 893,942 for example) capable of being controlled through the medium of the Bowden cables and linkages 16 from a control unit 161 and transmission gear 162 on the vehicle, the arrangement being such that downward thrust can be interchanged between fore and aft nozzles for pitch control and between port and starboard nozzles for roll control; pitch and roll moments can be applied simultaneously if required. Such an arrangement permits the most efficient use to be made of available bleed air since, if the aft nozzles are closed and the fore nozzles opened to the same extent, a full pitching moment is applied, whilst a full roll moment may be applied simultaneously, without increasing the consumption of bleed air, by now closing one fore nozzle and opening the other by an equal amount.

The subsidiary tubular sections 141, 142 carrying the jet nozzles 15 are mounted upon the ends of the respective trunks 14 by pivot joints 143 in such manner that when inoperative they may be folded about substantially vertical axes into positions indicated in FIG. 1 at 141A, 142A in which they are enclosed within the plan form outline 10 of the vehicle.

The operation of extending or retracting the sections 141, 142 is performed by means of a manual winding handle 144 which is geared to a sprocket 145. Chains 146 connects the sprocket 145 with oher sprockets 147 on the pivots of the sections 141, 142 so that the rotation of said handle 144 is effective to swing the sections inwardly or outwardly about their pivots.

Yaw control may be achieved by the use of additional fixed nozzles, 17, 17 located at the after extremities of the respective main trunks 14 and disposed laterally in relatively opposite directions. These yaw nozzles 17 are normally closed, but the effect of opening either of them singly will apply a yawing moment to the vehicle.

In the embodiment shown in FIGS. 3 and 4, the subsidiary tubular sections 141', 142' carrying the auxiliary jet nozzles 15' are capable of telescopic retraction into the ends of the main trunks 14'.

The extension of the sections 141', 142' is in this case effected by the air pressure in the trunks 14'. The retraction of said sections may be performed by means of hand-operated winches 18 which are connected to the fore and aft sections 141', 142' in pairs as shown by means of cables 181, 182.

FIGS. 5 and 6 show an arrangement in which the trunks 14" slope downwardly fore and aft from the connections 13".

The embodiment shown in FIGS. 7 and 8 differs from those hereinbefore described in that the main trunks 14''' extend from their connections with the lift engine 12''' in fore and aft directions along the longitudinal axis of the vehicle. In this case there are only two auxiliary control nozzles, 15''', each carried upon the end of a subsidiary tubular section 141''' or 142''' which is pivotally mounted at 19 upon the extremity of one of the main trunks 14''' with capability of swinging movement thereon about a horizontal axis.

The movement of the sections 141''', 142''' into or out of the operative position shown in full lines is effected by means of a manual winch 28 which is connected by chain-and-sprocket gearing 281, 282 with sprockets 283 respectively fixed on the sections 141''', 142''' at their pivots 19.

In use, the nozzle-carrying sections 141''', 142''' extend respectively fore and aft in slightly inclined attitudes, so that the fore nozzle 15''' is directed downwardly in front of the vehicle, whilst the aft nozzle occupies a similar position in the rear, both nozzles being above the centre of gravity. The nozzles may be, as in the aforesaid British Patent No. 893,942, of variable orifice area considered individually, but their closure means are so connected as to have constant total area, and each nozzle 15''' may be capable of swinging movement to either side of the longitudinal axis. Pitching moments are applied by differential variation of the nozzle orifice areas, rolling moments result from swinging both nozzles in unison to one side or the other, and yawing moments are achieved by swinging the nozzles differentially, as described in British Patent No. 893,942. All three types of moment can be applied simultaneously if required.

What we claim as our invention and desire to secure by Letters Patent is:

1. A land surface travel vehicle having a vertical take-off and landing jet lift engine, substantially horizontal gas supply trunks extending longitudinally of the vehicle and including inlets for receiving compressed gas tapped off from said jet lift engine, retractable tube sections disposed adjacent the ends of the vehicle and extending beyond the plan envelope of the vehicle in the operative positions, each of said retractable tube sections communicating with one of said gas supply trunks, and said retractable tube sections having means for moving said tube sections into retracted, stowed positions within the plan form envelope of the vehicle and for moving said tube sections into extended operative positions beyond the plan envelope of the vehicle, and auxiliary jet nozzles mounted at the extremities of said retractable tube sections for receiving compressed gas therefrom, said auxiliary jet nozzles having means for adjustably opening and closing the nozzle openings for exerting turning moments on the vehicle about at least one of its axes of reference.

2. A vehicle in accordance with claim 1, wherein there are two of said gas supply trunks, one extending along each side of the vehicle, with each of said gas supply trunks having two ends for communicating with said retractable tube sections, the ends of said gas supply trunks being equidistantly spaced on either side of the longitudinal axis of the vehicle, and wherein there are four of said retractable tube sections connected to separate ends of said gas supply trunks, and branch pipes connecting intermediate points of said gas supply trunks to the jet lift engine.

3. A vehicle in accordance with claim 2, and including a pair of outwardly directed fixed nozzles, one connected to each of said gas supply trunks, and means for opening either of said fixed nozzles singly to apply a yawing movement to the vehicle.

4. A vehicle in accordance with claim 1, wherein there are two of said gas supply trunks, each of said trunks being connected at one end to the jet lift engine and extending forward and aft, respectively, from the jet lift engine along the longitudinal axis of the vehicle, and wherein there are two of said retractable tube sections, each connected to an end of a gas supply trunk remote from the jet lift engine.

5. A vehicle in accordance with claim 1, wherein said retractable tube sections are telescopically connected to the ends of said gas supply trunks to permit movement between said extended and retracted positions.

6. A vehicle in accordance with claim 5, and including manually operated winch means for sliding each retractable tube section telescopically into said retracted position within the respective gas supply trunk.

References Cited by the Examiner

UNITED STATES PATENTS 2,912,188  11/1959  Singelmann et al. ____ 244—52 X

A. HARRY LEVY, *Primary Examiner*.